United States Patent [19]

Ohkura

[11] 4,183,661
[45] Jan. 15, 1980

[54] ENLARGER LENS SYSTEM HAVING STOP-VALUE SCALE ILLUMINATING MECHANISM

[75] Inventor: Zenichi Ohkura, Omiya, Japan

[73] Assignee: Asahi Kogaku Kogyo Kabushiki Kaisha, Tokyo, Japan

[21] Appl. No.: 941,708

[22] Filed: Sep. 12, 1978

[30] Foreign Application Priority Data

Sep. 16, 1977 [JP] Japan .................................. 52-111395

[51] Int. Cl.² ........................................... G03B 27/52
[52] U.S. Cl. ...................................... 355/61; 354/198; 355/63
[58] Field of Search .................... 354/198; 355/61, 62, 355/63, 18

[56] References Cited

U.S. PATENT DOCUMENTS

| | | | |
|---|---|---|---|
| 2,985,067 | 5/1961 | Hauptvogel et al. | 355/62 |
| 3,058,408 | 10/1962 | Jehmlich et al. | 354/198 |
| 3,997,264 | 12/1976 | Noguchi et al. | 355/61 |

*Primary Examiner*—Richard A. Wintercorn
*Attorney, Agent, or Firm*—Sughrue, Rothwell, Mion, Zinn and Macpeak

[57] ABSTRACT

An enlargement lens system has a light guide element positioned in the gap between the outer periphery of a rear lens group frame and a lens mount. A dispersion lens is provided on a portion of the rear lens and a transmission window is disposed on the rear lens frame. Light inside the effective area of the lens passes through the dispersion surface and the transmission window onto the light guide. The reflex surface on the guide reflects light onto the lens stop-value scale.

10 Claims, 6 Drawing Figures

ENLARGER LENS SYSTEM HAVING STOP-VALUE SCALE ILLUMINATING MECHANISM

BACKGROUND OF THE INVENTION

An enlargement lens system using a light guide device with a light surce of an enlarger for illuminating a stop-value scale thereof is generally known. It is used to simplify the photographic enlargement operation in a dark room. As well known in such a method of illuminating a stop-value scale for an enlargement lens system, a light ejected from the enlarger into a gap formed between an outer peripheral portion of a rear lens group frame and a lens mount thereof is reflected radially at a light guide disposed inside a stop-value scale member. This will achieve stop-value scale illumination.

However, this techinique of stop-value scale illumination has a material disadvantage when used in an enlargement with picture trimming or when applied to a enlargement lenses having a long focal length and a large diameter. Specifically, in an enlargement of a picture, trimming of an original picture to properly frame the sections of interest is often carried out. The trimming operation is accomplished by use of light shut-off plate installed in the enlarger. Therefore, in the case of the above-described stop-value scale illuminating, since the transmitting light will pass through the gap formed by the outer peripheral portion and the lens mount, then light around the margin or peripheral light is partially shut off by the light shut-off plate, i.e., the light for illuminating the stop-value scale is cut away. As a result, illumination of the stop-value scale is not achieved.

Also, it is required in the enlargement process to have the time duration of light-exposure minimized. Additionally, a general requirement exists that the enlargement lens have a large diameter for easy handling thereof. Generally, large diameter lenses tend to deteriorate in performance in situations involving light from the margin portions of the picture. For this reason, non-uniform light exposure during the enlargement operation results. Therefore, a technique is employed to increase the effective diameter of a lens to prevent deterioration of the marginal light. As a result, however, the rear lens frame of the large diameter lens is increased and a gap is formed by the peripheral portion of the rear lens group and the lens mount. This gap is extremely small and it is very difficult to pass transmitting light necessary for illuminating the stop-value scale through this gap.

Additionally, in an enlargement lens having a long focal length where the rear lens frame is large with respect to the inner diameter of the mount portion, the stop-value scale illumination technique is not practiced.

SUMMARY OF INVENTION

Briefly, a primary object of the present invention is to provide a stop-value scale lighting mechanism which can be used in a trimming operation on original pictures during photographic enlargement.

It is another object of this invention to provide a stop-value lighting mechanism for an enlargement lens having a large diameter with respect to a diameter of a mount portion and also to an enlargement lens having a long focal length.

These and other objects of this invention are accomplished by providing a dispersion surface on a part of a rear lens group in the enlarger. The dispersion surface is located on a segment of the lens outside the effective diameter and optically corresponds to a light guide mounted between the lens mount and a frame. This will permit the transmission of light through the dispersion surface to illuminate the stop-value scale through the light guide.

DESCRIPTION OF THE PREFERRED EMBODIMENT

Figure 1:
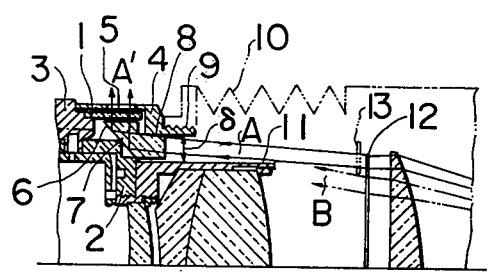
FIG. 1. is a cut-away side view of a stop-value scale illumination device used in an conventional enlarger.

Referring now to FIG. 1 a light transmission technique in a conventional stop-value illuminating device is shown. A stop-value scale annular ring 1 is formed of transparent material having a stop-value scale printed thereon. The ring 1 is disposed on a stop-value opening and closing operating sleeve 3 of a lens mount 2. A lens mount ring 4 is screw-threaded into an enlarger 10 by threading the mounting portion 9.

The lens mount ring 4 is provided integrally with the lens mount 2. A light guide 7 including a reflex surface 6 is supported at a mounting portion 8 of the lens mount ring 4 including a stop-value scale reading window 5. As shown in FIG. 1 the outermost diameter of a rear lens group frame 11 is threaded into the lens mount 2 and is smaller than an inner diameter of the mounting portion 9. Through the gap δ, light A passed through a margin portion of an original picture film 12 from a light source (not shown) of the enlarger 10 is introduced into the light guide 7 and reflected at the reflex surface 6 as a light A' to thereby illuminate the stop-value scale. However, when the operation of a light shut-off plate 13 provided in the enlarger 10 occurs for trimming the picture, light A is severly reduced or shut off. Light B inside the effective area of the trimmed enlargement is interrupted by the rear lens frame 11 so that the stop-value scale can not be illuminated.

Figure 2:
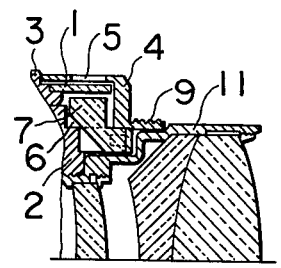
FIG. 2 is a cut-away side view of a stop-value scale illumination in an conventional enlarger having a rear lens group frame having a large diameter.

FIG. 2 shows the conventional stop-value illuminating device of FIG. 1, where an enlargement lens having a long focal length and a large diameter is used. As shown, outer diameter of the rear lens group frame is larger than the inner diameter of the mounting portion 9. In this situation, the stop-value scale is not illuminated under any conditions because the above-described gap δ becomes zero.

Figure 3:
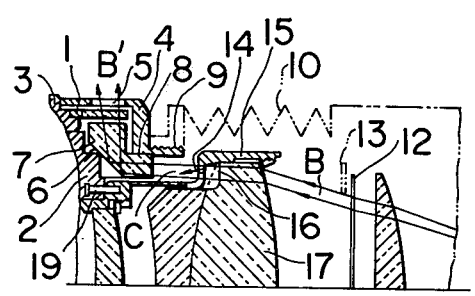
FIGS. 3 to 5 are cut-away side views of a stop-value scale illuminating device according to the present invention.

FIG. 3 shows a first embodiment of the invention. A rear lens group frame 15 is provided with a light transmission window 14 optically corresponding to a light guide 7. A dispersion surface 16 is formed on a lens 17 outside its effective diameter by a grinding or the like. The ground portion 16 prevents light from reflecting in the direction C designated by a dotted line in FIG. 3. The lens 17 is fixed integrally in frame 15 by coupling the frame to the lens mount 2 by a pin 19. W..h such a construction, light B inside a light shut-cff plate 13 is introduced through the light transmission window 14 to the light guide 7 and is emitted therefrom illuminating a stop-value scale as a reflex light B'.

Figure 4:
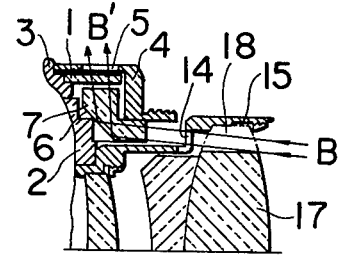

FIG. 4 shows a second embodiment of the present invention. Light from the enlarger is introduced through a cut away portion 18 of the lens 17 and a window 14 formed in a rear lens frame 15. This light passes through the light guide 7 to thereby illuminate the stop-value scale.

Figure 5:
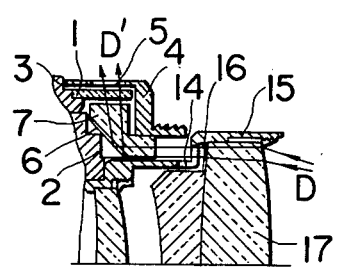

FIG. 5 shows a third embodiment of the present invention. A lens 17 is provided having a low dispersion characteristic surface 16. Directionaly light D from the enlarger is reflected at the lens 17 and introduced through a light tramsnission window 14 to the light guide 7. Also, as shown by the ray lines in FIG. 5 light other than the light D is introduced in the light guide by the low dispersion characteristic surface 16.

Figure 6:
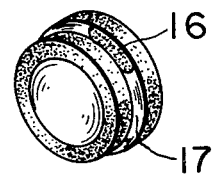
FIG. 6 shows a perspective view of a lens having a dispersion surface in accordance with this invention.

FIG. 6 shows an perspective view of a lens 17 in the FIG. 5 embodiment in which a dispersion surface 16 is provided when using the lens of the above-described embodiment, it is possible to produce the rear lens group frame 15 integrally with the lens mount ring 4 to thereby fixedly support the lens 17.

As shown in those embodiments, the technique of stop-value scale illumination is different from the case of conventional prior art devices. In the present invention, since light inside the lens is utilized as the light for illuminating the lens stop-value, light near the center of the original picture frame is introduced into the light guide. Therefore, the stop-value scale can be illuminated irrespective of the reduced effective area that occurs during picture trimming and framing. Further, there is no effect of the rear lens frame at all. Accordingly, positive stop-value scale illumination can be achieved and the choice of lenses to be used in the enlarger is increased when using the device according to the present invention.

It is apparent that modifications and variations can be made to the basic embodiments discloses herein that are within the scope of this invention.

I claim:

1. In an enlarger having a light source, a rear lens group, a rear lens group frame, a lens mounting portion, a light guide positioned between the rear lens group frame and the lens mounting portion and a lens stop-value scale, the improvement comprising: a light transmission window formed in said rear lens group frame and dispersion means disposed on a lens of said rear lens group whereby light from said source passing through said dispersion means will be reflected by said light guide onto said lens stop-value scale.

2. The enlarger of claim 1 wherein said dispersion means is formed outside the effective area of said lens.

3. The enlarger of claim 2 wherein said window is provided on a mounting surface of said frame and is optically aligned with said dispersion means.

4. The enlarger of claim 1 further comprising means to couple said frame to said lens mount.

5. The enlarger of claim 2 wherein said dispersion means comprises a surface ground on said lens.

6. The enlarger of claim 2 wherein said dispersion means comprises a cut-away portion of said cut-away portion being optically aligned with said window.

7. The enlarger of claim 2 wherein said dispersion means comprises a portion on said lens having a low dispersion characteristic whereby light from said source is reflected by said portion through said window.

8. The enlarger of claim 1 further comprising a lens mounting ring and a stop-value adjusting sleeve, wherein said stop value scale is positioned between said mounting ring and said sleeve.

9. The enlarger of claim 8 further comprising a reading window supported by said mounting ring.

10. The enlarger of claim 9 further comprising means to couple said lens group frame to said lens mount.

* * * * *